(No Model.)
L. W. FABER.
ERASIVE RUBBER HOLDER.
No. 461,205. Patented Oct. 13, 1891.
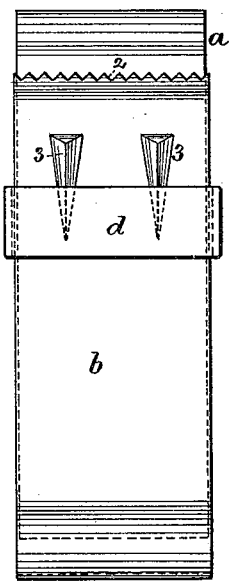
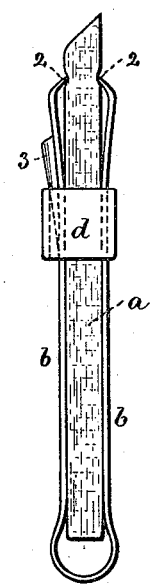
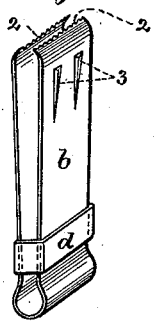
Witnesses:
J. Stait
Chas. H. Smith
Inventor:
Lothar W. Faber
per Lemuel W. Serrell
Atty.

UNITED STATES PATENT OFFICE.

LOTHAR W. FABER, OF PORT RICHMOND, NEW YORK.

ERASIVE-RUBBER HOLDER.

SPECIFICATION forming part of Letters Patent No. 461,205, dated October 13, 1891.

Application filed August 21, 1890. Serial No. 362,577. (No model.)

*To all whom it may concern:*

Be it known that I, LOTHAR W. FABER, a citizen of the United States, residing at Port Richmond, in the county of Richmond and State of New York, have invented an Improvement in Erasive-Rubber Holders, of which the following is a specification.

Erasive rubber has been made as a comparatively thin strip, so that the end is narrow and adapted especially to type-writers, who often have to rub out single letters upon the manuscript. Rubbers of this character have sometimes been inserted into flat tubes and pushed out from time to time as worn away; but in practice it is found that the rubber is not grasped with sufficient firmness to remain in position under the pressure incident to use.

My invention relates to the combination of a folded holder of sheet metal or similar material with an erasive strip and a slide-band to press the folded holder upon the strip of rubber, and I employ holding-teeth at the ends of the folded strip, and inclines upon which the slide-band acts to firmly grasp the erasive strip.

In the drawings, Figure 1 is an edge view of the holder and erasive rubber. Fig. 2 is a detached perspective view of the folded holder, and Fig. 3 is a side view of the holder and rubber, Figs. 1 and 3 being of a magnified size.

The rubber *a* is of a suitable length, width, and thickness, and it is sufficiently thin to adapt such erasive rubber to the use of typewriters and others.

The holder *b* is made of a folded piece of sheet material that is as wide as the erasive rubber and of about twice the length, so that the holder may be folded in the middle, and it is adapted to receive the rubber between the two sides of the holder, and at the ends of the holder there are teeth 2 that project toward each other, and the inclined or wedge-shaped projections 3 are provided upon the surface of the holder, and there is a slide-band *d* surrounding the holder, and the sizes of the parts are such that when the band is not in contact with the projections 3 the two parts of the holder spring apart sufficiently for the erasive rubber *a* to be inserted into the holder or removed therefrom or adjusted to any desired position, and when the slide-band is moved into contact with the inclines 3 the holder is made to clamp the rubber, and the teeth 2 aid in firmly holding the same.

I claim as my invention—

As a new article of manufacture, the erasive implement herein described, consisting of a thin flat strip of erasive rubber protected on its two flat sides and one end by the sheet-metal folded strip bowed at the rear, toothed at the ends to grasp the projecting end of the rubber, provided with rising inclines toward the forward end of one or both sides, and furnished with the sliding clamp-ring, all substantially as shown and described.

Signed by me this 19th day of August, 1890.

LOTHAR W. FABER.

Witnesses:
F. L. KOLK,
C. C. FLEMING.